US012416183B2

(12) United States Patent
Douglas

(10) Patent No.: US 12,416,183 B2
(45) Date of Patent: Sep. 16, 2025

(54) LATCH LOCK ASSEMBLY WITH FAULT MONITORING, AND CLOSURE STRUCTURE HAVING SUCH A LATCH LOCK ASSEMBLY

(71) Applicant: Elevate Aircraft Seating LLC, Bothell, WA (US)

(72) Inventor: Mark Douglas, Newport (GB)

(73) Assignee: Elevate Aircraft Seating LLC, Bothell, WA (US)

( * ) Notice: Subject to any disclaimer, the term of this patent is extended or adjusted under 35 U.S.C. 154(b) by 175 days.

(21) Appl. No.: 18/473,849

(22) Filed: Sep. 25, 2023

(65) Prior Publication Data

US 2025/0101771 A1 Mar. 27, 2025

(51) Int. Cl.
*E05B 47/00* (2006.01)
*E05B 41/00* (2006.01)
*E05B 63/00* (2006.01)

(52) U.S. Cl.
CPC .......... *E05B 47/0002* (2013.01); *E05B 41/00* (2013.01); *E05B 63/0069* (2013.01); *E05B 2047/0016* (2013.01); *E05B 2047/0069* (2013.01)

(58) Field of Classification Search
CPC ......... Y10T 292/1047; Y10T 292/1082; E05B 2047/0046; E05B 2047/0054; E05B 81/00; E05B 81/04; E05B 81/64; E05B 81/66; E05B 81/72; E05B 81/74; B64D 11/003; B64D 11/0007; B64D 11/04; B64C 1/14
USPC .................................................. 312/215, 222
See application file for complete search history.

(56) References Cited

U.S. PATENT DOCUMENTS 6,135,513 A * 10/2000 Hamada .................. E05B 81/20 292/201
2018/0171689 A1 * 6/2018 Kalathil .................. E05B 5/006
2018/0266159 A1 * 9/2018 Bito .......................... E05F 3/16

* cited by examiner

*Primary Examiner* — Christine M Mills
*Assistant Examiner* — Yahya Sidky
(74) *Attorney, Agent, or Firm* — Yee & Associates, P.C.

(57) ABSTRACT

A latch lock assembly to facilitate movement of a closure structure between a stowed position and an open position. The latch lock assembly includes fault detection and electro-mechanical monitoring of components of the latch lock assembly. In the event of a detected fault operating condition by the latch lock assembly, a manual override mechanism may be employed to enable a user to advance the closure structure from the stowed position to the open position.

20 Claims, 12 Drawing Sheets

LATCH LOCK ASSEMBLY WITH FAULT MONITORING, AND CLOSURE STRUCTURE HAVING SUCH A LATCH LOCK ASSEMBLY

FIELD

A latch lock assembly having fault detection and electro-mechanical monitoring of latch members and trigger members that are contained in a single housing. Each latch member has autonomous functionality that permits independent rotation relative to the other latch member. The latch members and trigger members are operable to facilitate movement of a closure structure moveable between a stowed position and an open position. In the event of a detected fault operating condition or state of the latch lock assembly, a manual override mechanism may be employed to enable a user to advance the closure structure from the stowed position to the open position.

BACKGROUND

A vehicle such as an aircraft includes a plurality of closure structures within the cabin. Some closure structures define a storage space sized to receive one or more items therein, and are selectively moveable between a closed or stowed position and an open position.

SUMMARY

In an exemplary embodiment, a latch lock assembly for a closure structure system includes at least one latch member mounted for rotation about a pivot axis at a single housing, and an electro-mechanical actuator to facilitate rotation of the at least one latch member between a latched operating state to maintain a base frame of a closure structure in the stowed position and an unlatched operating state to initiate advancement of the base frame from the stowed position to the open position. Each latch member has autonomous functionality that permits independent rotation relative to the other latch member.

The latch lock assembly is located in a rear of the base frame, and thus, does not lend itself to visual or physical inspection. Accordingly, for purposes of maintenance and safety, the latch lock assembly includes a fault detection assembly which is operable to monitor one or more systems, sub-systems, components, etc. of the latch lock assembly. In particular, the fault detection assembly is operable to detect one or more fault operating conditions of the latch lock assembly. In response to a detected fault operating condition, a control module that is electrically connected to the latch lock assembly is operable to cause display of at least a visual, an audial, and a haptic warning of the detected fault operating condition.

In event of a fault operating condition of the latch lock assembly, a manual override assembly may be used by a user to advance the base frame between the stowed position to the open position.

In an exemplary embodiment, a latch lock assembly for a closure structure includes one or more of the following: a housing; a first latch member pivotably mounted to the housing for rotation between a latched operating state to maintain the closure structure in a stowed position and an unlatched operating state to initiate the closure structure advancing from the stowed position to an open position; an actuator mechanism operable to cause rotation of the first latch member to the unlatched operating state; and a fault detection assembly operable to detect a fault operating condition of at least one of the latch lock assembly and the closure structure.

In accordance with the latch lock assembly, a second latch member is pivotably mounted to the housing for rotation between a latched operating state to maintain the closure structure in a stowed position and an unlatched operating state to initiate the closure structure advancing from the stowed position to the open position.

In accordance with the latch lock assembly, a first trigger member is pivotably mounted at the housing for rotation which causes the rotation of the first latch member to the unlatched operating state.

In accordance with the latch lock assembly, a second trigger member is pivotably mounted at the housing for rotation which causes the rotation of the second latch member to the unlatched operating state.

In accordance with the latch lock assembly, the fault detection assembly comprises a first yoke member operatively connected to the first latch member and the first trigger member for rotation in response to the rotation of the first latch member and the first trigger member.

In accordance with the latch lock assembly, the fault detection assembly comprises a second yoke member operatively connected to the second latch member and the second trigger member for rotation in response to the rotation of the second latch member and the second trigger member.

In accordance with the latch lock assembly, the fault detection assembly comprises a first electric microswitch operable to detect of change of operating state of the latch lock assembly in response to being engaged by the first yoke member.

In accordance with the latch lock assembly, the fault detection assembly comprises a second electric microswitch operable to detect of change of operating state of the latch lock assembly in response to being engaged by the second yoke member.

In accordance with the latch lock assembly, a control module having one or more processors and a non-transitory memory is coupled to the one or more processors, the non-transitory memory including a set of instructions of computer-executable program code, which when executed by the one or more processors, cause the control module to: monitor the first electric microswitch and the second electric microswitch, and cause, in response to receipt of an electric signal from at least one of the first electric microswitch and the first electric microswitch that is indicative of a detected fault operating condition, at least a visual warning of a detected fault operating condition.

In accordance with the latch lock assembly, a manual override mechanism is operable to advance the closure structure from the stowed position to the open position in response to a detected fault operating condition.

In accordance with the latch lock assembly, the manual override mechanism is operatively connected to the first trigger member to actuate the first trigger member in response to the detected fault operating condition.

In accordance with the latch lock assembly, the manual override mechanism is operatively connected to the second trigger member to actuate the second trigger member in response to the detected fault operating condition.

In an exemplary embodiment, a closure structure system includes one or more of the following: a base frame moveable between a stowed position and an open position; and a latch lock assembly including: a housing; a first latch member pivotably mounted to the housing for rotation between a latched operating state to maintain the base frame in a stowed position and an unlatched operating state to initiate the base frame advancing from the stowed position to an open position; an actuator mechanism operable to cause rotation of the first latch member to the unlatched operating state; and a fault detection assembly operable to detect a fault operating condition of at least one of the latch lock assembly and the base frame.

In accordance with the closure structure system, the latch lock assembly further includes a second latch member pivotably mounted to the housing for rotation between a latched operating state to maintain the base frame in a stowed position and an unlatched operating state to initiate advancement of the base frame from the stowed position to the open position.

In accordance with the closure structure system, a second latch member is pivotably mounted to the housing for rotation between a latched operating state to maintain the base frame in a stowed position and an unlatched operating state to initiate the base frame advancing from the stowed position to the open position.

In accordance with the closure structure system, a first trigger member is pivotably mounted at the housing for rotation which causes the rotation of the first latch member to the unlatched operating state.

In accordance with the closure structure system, a second trigger member is pivotably mounted at the housing for rotation which causes the rotation of the second latch member to the unlatched operating state.

In accordance with the closure structure system, the fault detection assembly comprises a first yoke member operatively connected to the first latch member and the first trigger member for rotation in response to the rotation of the first latch member and the first trigger member.

In accordance with the closure structure system, the fault detection assembly comprises a second yoke member operatively connected to the second latch member and the second trigger member for rotation in response to the rotation of the second latch member and the second trigger member.

In accordance with the closure structure system, the fault detection assembly comprises a first electric microswitch operable to detect of change of operating state of the latch lock assembly in response to engagement by the first yoke member.

In accordance with the closure structure system, the fault detection assembly comprises a second electric microswitch operable to detect of change of operating state of the latch lock assembly in response to being engaged by the second yoke member.

In accordance with the closure structure system, a control module having one or more processors and a non-transitory memory is coupled to the one or more processors, the non-transitory memory including a set of instructions of computer-executable program code, which when executed by the one or more processors, cause the control module to: monitor the first electric microswitch and the second electric microswitch, and cause, in response to receipt of an electric signal from at least one of the first electric microswitch and the first electric microswitch that is indicative of a detected fault operating condition, at least a visual warning of a detected fault operating condition.

In accordance with the closure structure system, a manual override mechanism is operable to advance the base frame from the stowed position to the open position in response to a detected fault operating condition.

In accordance with the closure structure system, the manual override mechanism is operatively connected to the first trigger member to actuate the first trigger member in response to the detected fault operating condition.

In accordance with the closure structure system, the manual override mechanism is operatively connected to the second trigger member to actuate the second trigger member in response to the detected fault operating condition.

In accordance with the closure structure system, the base frame comprises a drawer.

In accordance with the closure structure system, the base frame comprises a bin.

In accordance with the closure structure system, the base frame comprises a door.

In an exemplary embodiment, a computer implemented method of operating a vehicle cabin storage assembly includes one or more of the following: monitoring an operating state of the vehicle cabin storage assembly; and causing, in response to receipt of an electric signal that is indicative of a detected fault operating condition of the vehicle cabin storage assembly, at least a visual display of a warning of a detected fault operating condition.

BRIEF DESCRIPTION OF DRAWINGS

The various advantages of the examples of the present disclosure will become apparent to one skilled in the art by reading the following specification and appended claims, and by referencing the following drawings, in which:

DESCRIPTION

Examples set forth herein provide an enhanced latch lock assembly for a closure structure. In particular, this disclosure relates to a latch lock assembly for implementation in a closure structure of an aircraft. The latch lock assembly includes independently rotatable latch members with corresponding trigger members that are housed in a single enclosure. The latch members may be used redundantly in order to maintain the functionality of the latch lock assembly in the event of failure of one latch member. In that way, the other latch member will still function to retain the closure structure in a stowed or closed position.

Rotating movement by each trigger member causes rotation of a corresponding latch member by engagement with a cam surface of the latch members. A single unidirectional actuator such as, for example, a solenoid actuator, is operable to actuate the trigger members for rotation against a spring/bias force. Rotation by the trigger members, in turn, causes the trigger members to engage the latch members for rotation from a latched operating state which maintains the closure structure in a stowed position to an unlatched operating state to facilitate movement of the closure structure from the stowed position to an open position.

The latch lock assembly is installed at a rear of the closure structure. Locating the latch lock assembly at the rear of the closure structure poses a challenge in terms of performing visual or physical inspection of the latch lock assembly. Accordingly, the latch lock assembly includes an electro-mechanical detection assembly that is operable to detect operational failure of the latch lock assembly (e.g., the latch members, the trigger members, the solenoid actuator, etc.). The electro-mechanical detection assembly causes, in response to detecting an operational failure of the latch lock assembly, transmission of a control signal to a control module to cause the transmission of one or more of an audio alert, a visual alert, and a haptic alert indicating the operational failure of the latch lock assembly.

In case of an electrical or solenoid failure of the latch lock assembly, a mechanical override assembly is provided to enable the closure structure to be moved between a stowed position and an open position.

Figure 1:
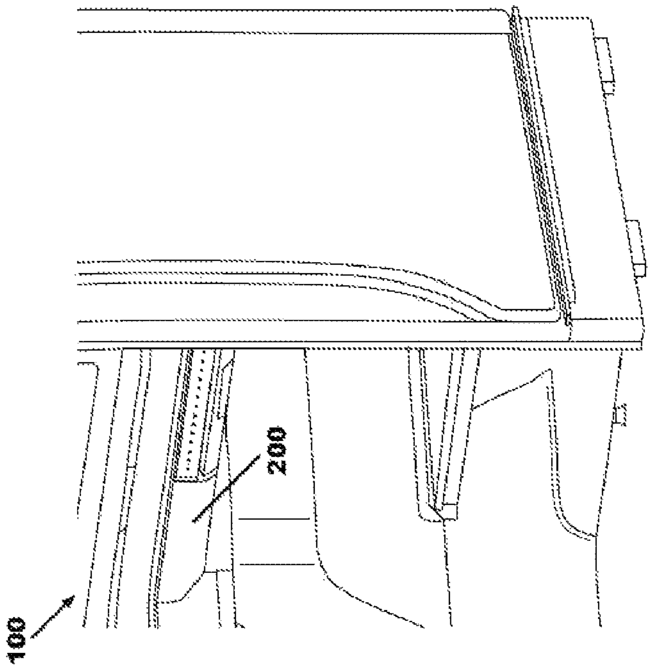
FIG. 1 illustrates a perspective view of a passenger module having a closure structure.

In the illustrated exemplary embodiment of FIG. 1, a passenger furniture device 100 includes a closure structure 200. In the illustrated exemplary embodiment of FIG. 2, the closure structure 200 comprises a retractable storage drawer. Embodiments, however, are not limited thereto, and thus, this disclosure contemplates the closure structure 200 comprising any suitable closure structure 200 that falls within the spirit and scope of the principles of this disclosure.

Figure 2:
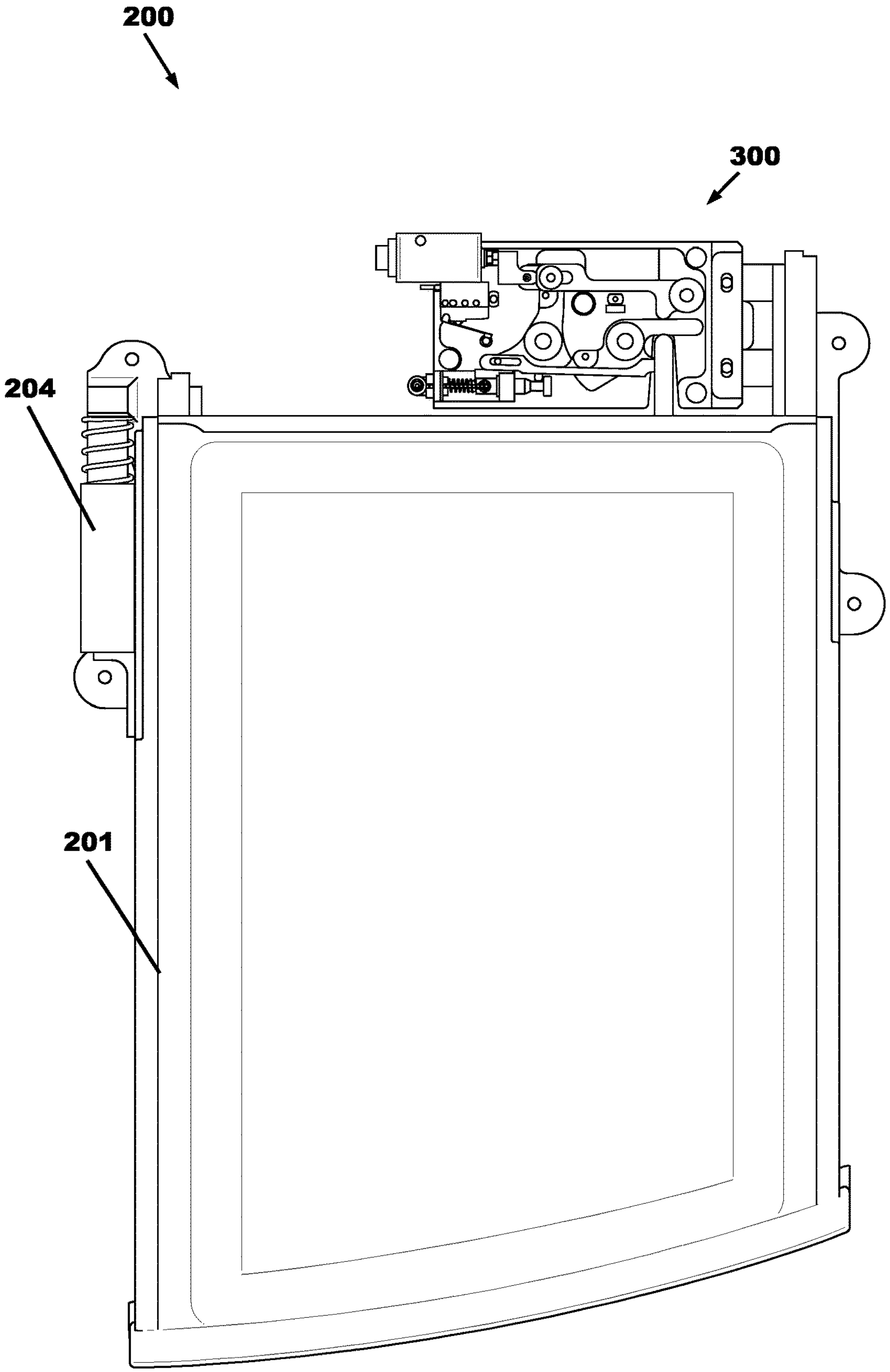
FIG. 2 illustrates a top view of an advantageous embodiment of a closure structure having a latch lock assembly for the of FIG. 1.
Figure 3:
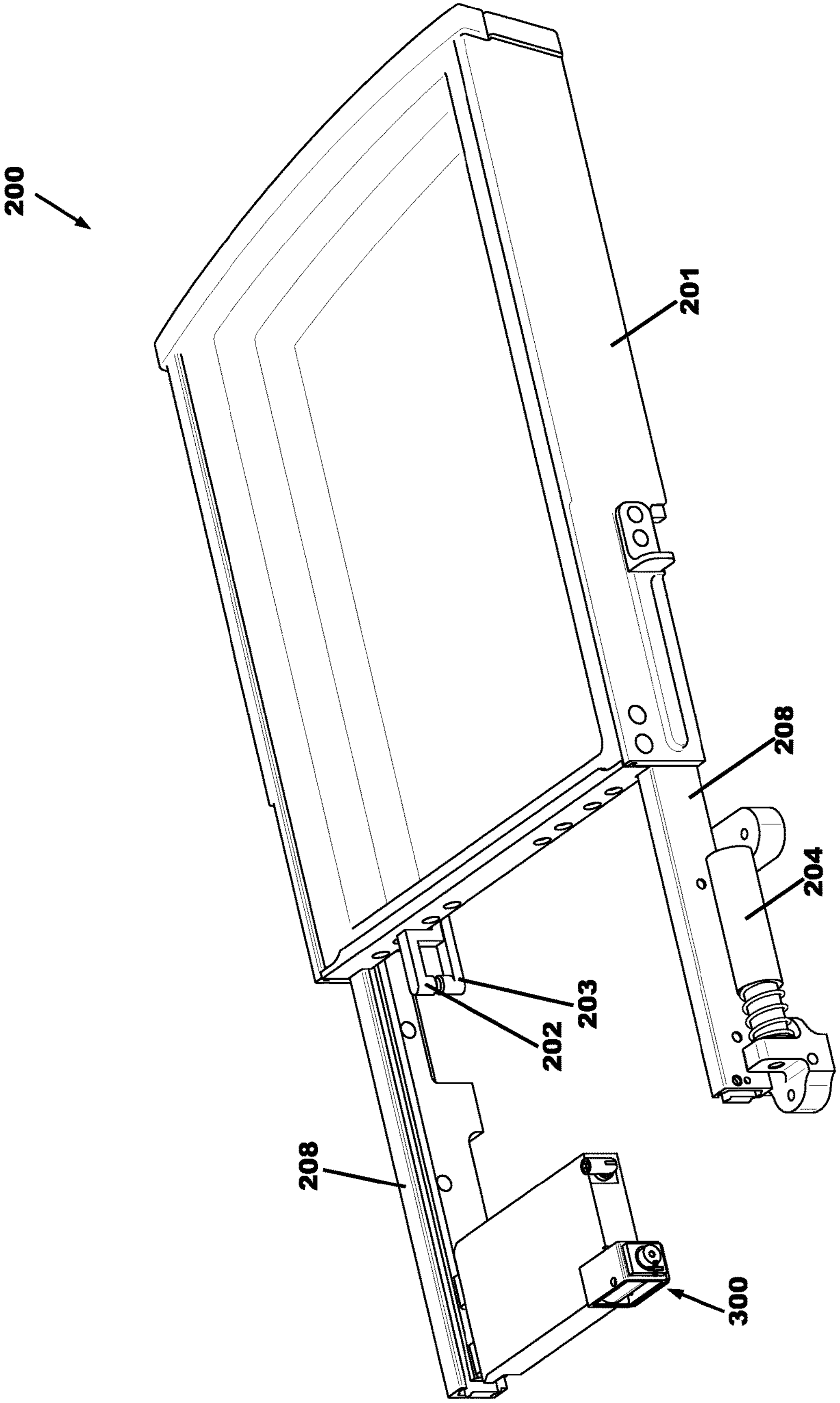
FIG. 3 illustrates a perspective view of the closure structure of FIG. 2.

In the illustrated exemplary embodiment of FIGS. 2 and 3, the closure structure 200 includes a base frame 201 having a plurality of walls that includes a front wall, a rear wall, a pair of opposing sidewalls, and a bottom wall that collectively define a storage space to receive one or more items or articles therein. The sidewalls of the base frame 201 includes structural architecture that facilitates movement of the closure structure 200 along one or more rails 208 in a longitudinal direction between a stowage position and an open position. A latch lock assembly 300 is positioned at a rearward region of the closure structure 200. When the closure structure 200 reaches the closed position, the latch lock assembly 300 engages latch keep members 202, 203 that are mounted at an outer rear surface of the rear wall of the closure structure 200 to maintain the closure structure 200 in the stowed position. In an unlatched operating state, the latch lock assembly 300 disengages the latch keep members 202, 203 to facilitate or otherwise initiate advancement of the closure structure 200 to an open (partially open or fully open) position.

Figure 4:
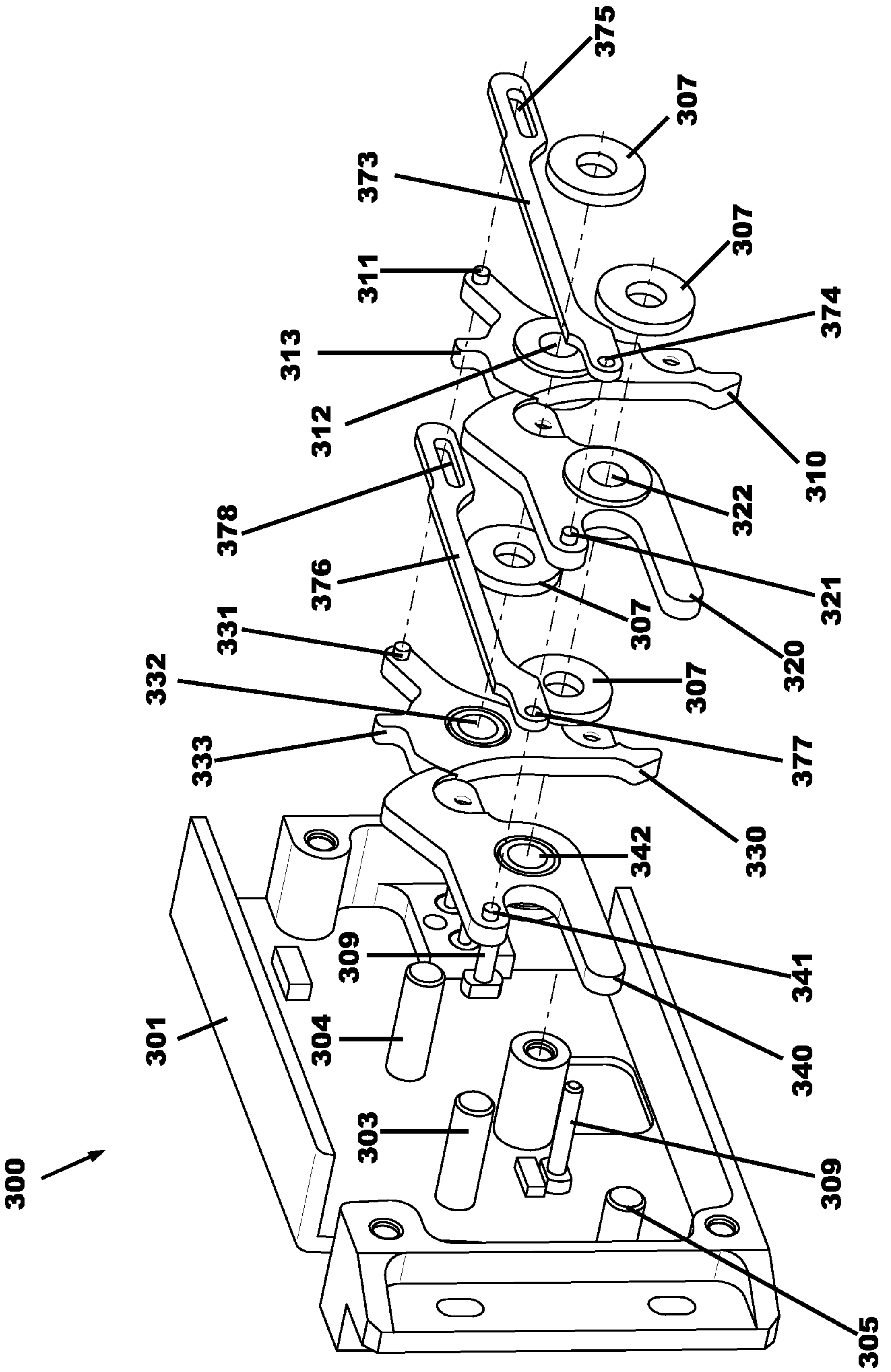
FIGS. 4 and 5 illustrate exploded views of the latch lock assembly of FIG. 2.
Figure 5:
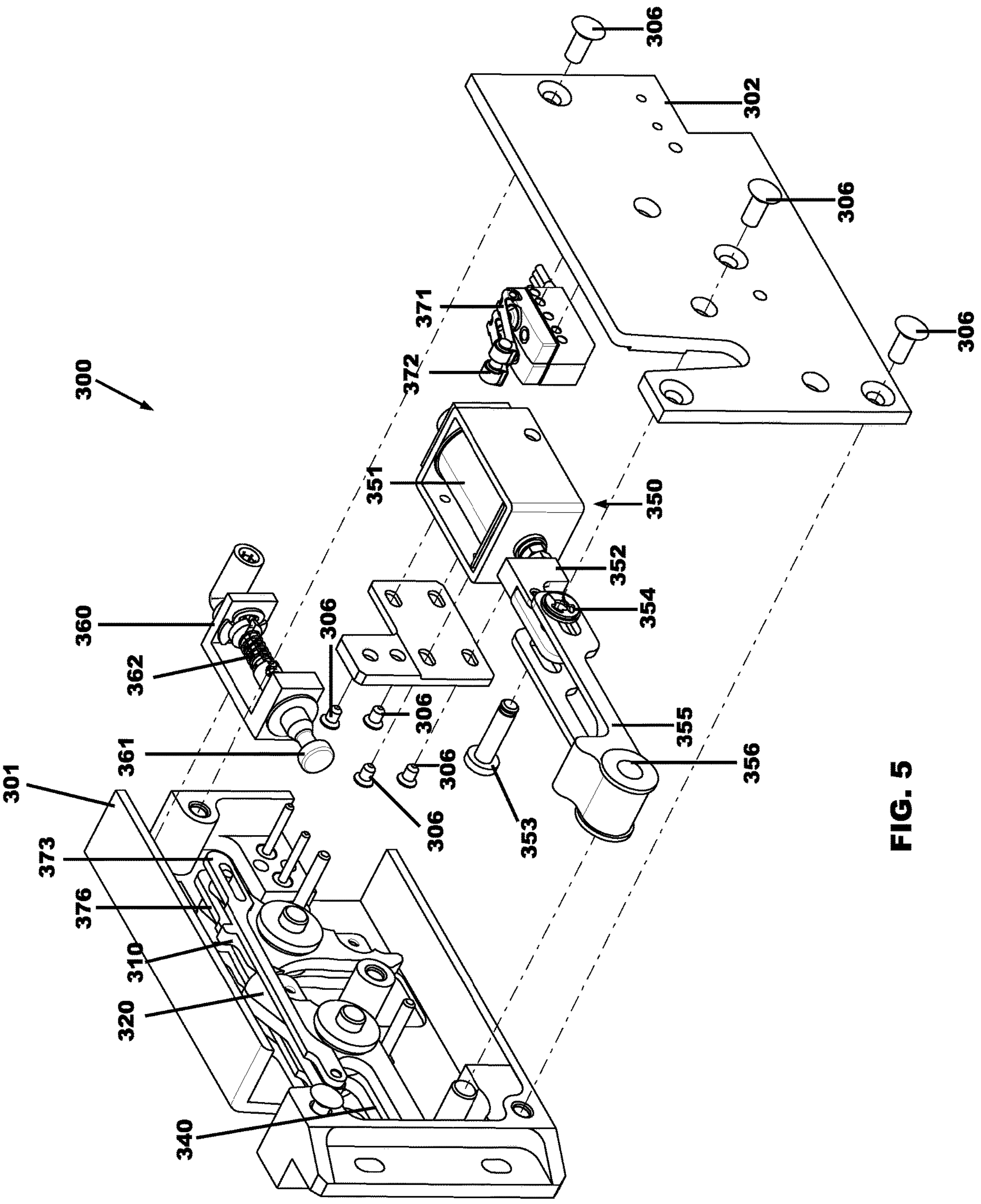
Figure 10:
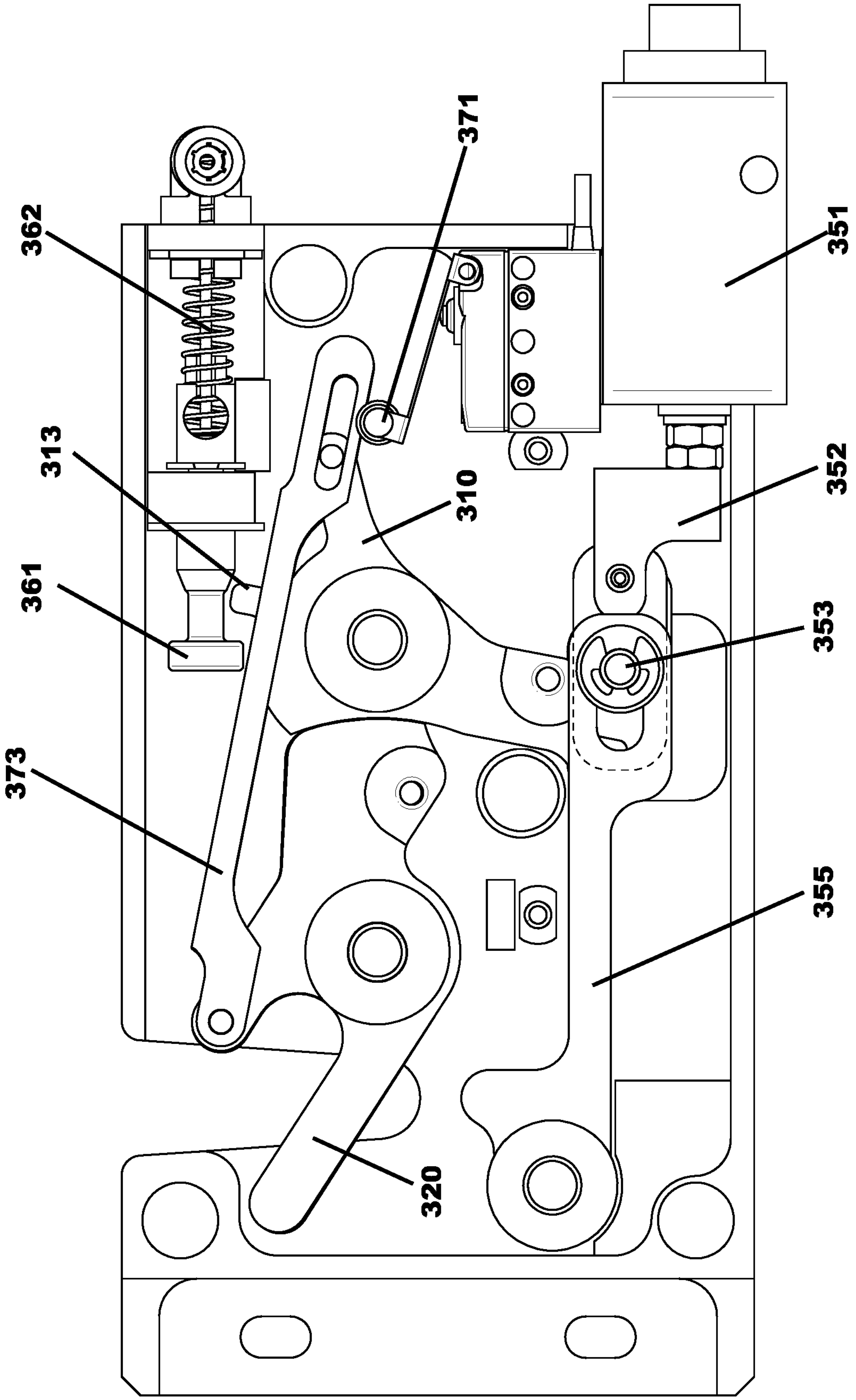

In the illustrated exemplary embodiment of FIGS. 4, 5, and 10, the latch lock assembly 300 comprises a housing, a pair of latch members 320, 340, a pair of trigger members 310, 330, an electro-mechanical actuator mechanism 350, a mechanical override assembly 360, and a fault detection assembly 370.

Housing

In the illustrated exemplary embodiment of FIGS. 4 and 5, the housing has a bifurcated structural configuration that includes a base frame 301 and a housing cover 302 forming an interconnection that defines an interior space to receive the latch members 320, 340, the trigger members 310, 330, the mechanical override assembly 360, and the fault detection assembly 370 that includes in part a pair of yoke members 373, 376. The housing also facilitates an operative connection with the electro-mechanical actuator mechanism 350.

The base frame 301 and the housing cover 302 are connected via one or more mechanical fasteners 306. Embodiments, however, are not limited thereto. This disclosure contemplates connecting the base frame 301 and the housing cover 302 using any suitable technique that falls within the spirit and scope of the principles of this disclosure. For example, the base frame 301 and the housing cover 302 may be integrally formed, using a molding technique, as a single, unitary body. The base frame 301 and the housing cover 302 may be composed in whole or in part of a polymer material. Embodiments, however, are not limited thereto. This disclosure contemplates forming the base frame 301 and the housing cover 302 of any suitable material that falls within the spirit and scope of the principles of this disclosure.

Latch Members

Figure 6:
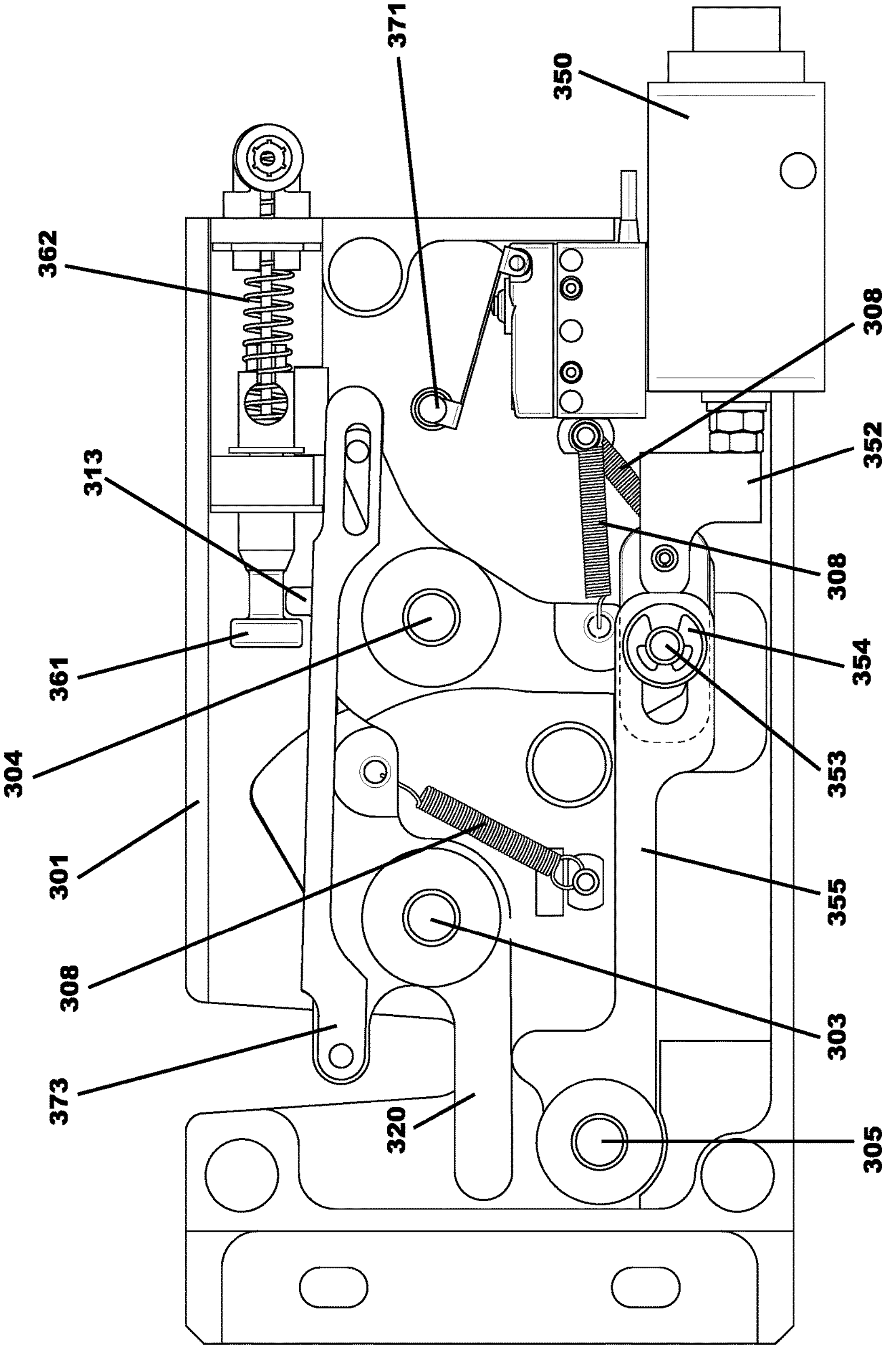
FIG. 6 illustrates a top view of the latch lock assembly of FIG. 2 in a locked operating state.
Figure 7:
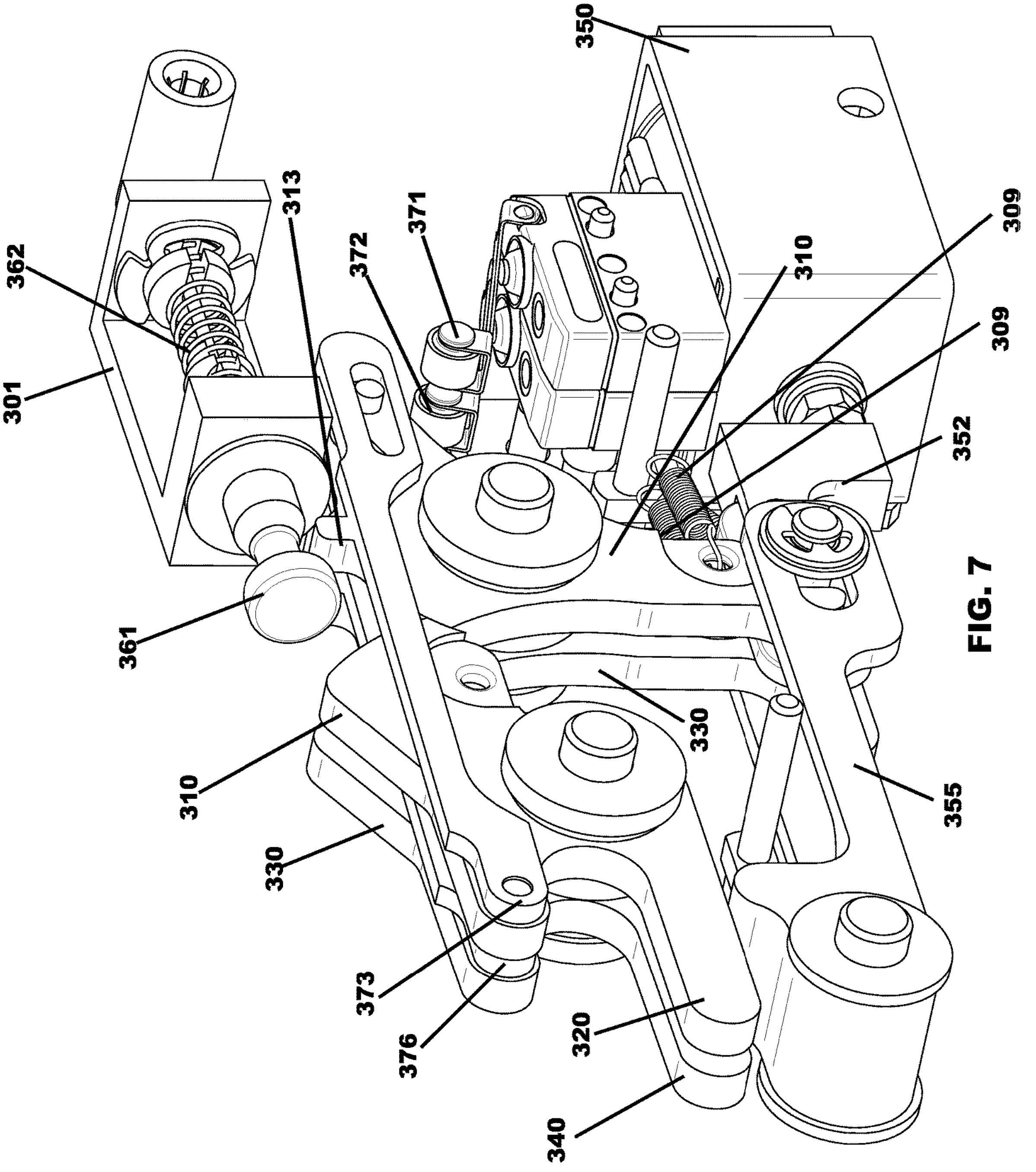
FIG. 7 illustrates a perspective view of the latch lock assembly of FIG. 2 with the housing cover and base frame removed.
Figure 8:
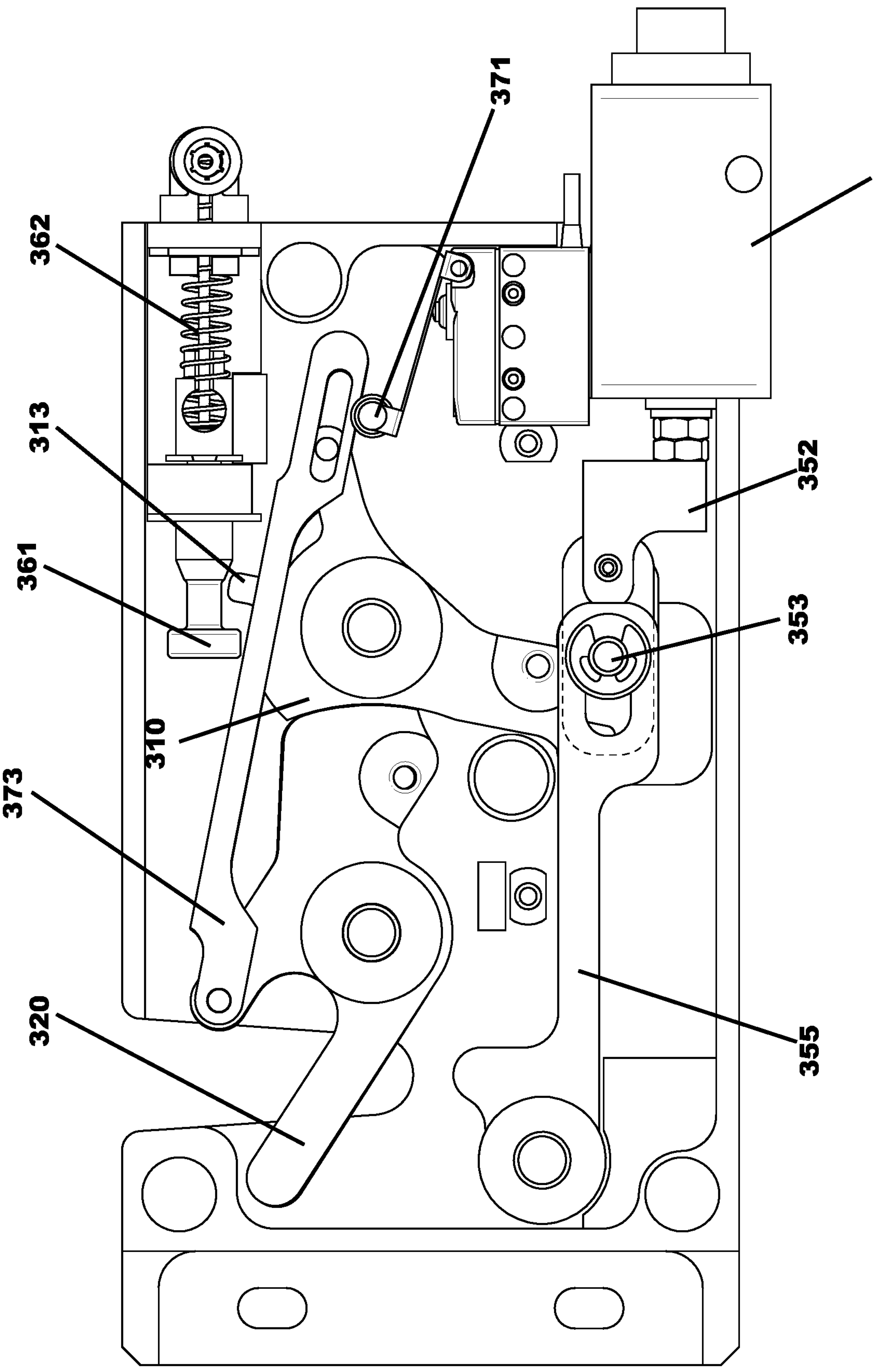
FIG. 8 illustrates a top view of the latch lock assembly of FIG. 2 in an unlocked operating state.

In the illustrated exemplary embodiment of FIGS. 4 and 5, the latch members 320, 340 are operable for rotation at a first pivot axis between a first latch position/latched operating state (See FIG. 6) and a second latch position/unlatched operating state (See FIG. 8). In the first latch position/latched operating state, the latch members 320, 340 engage the latch keep members 202, 203 to thereby maintain the closure structure 200 in a stowed position. When in the latched operating state, the latch members 320, 340 are under spring tension of one or more bias members 309 (mounted on spring pin mounts 309) in the form of coil springs. The spring tension causes the latch members 320, 340 to rotate in a clockwise direction for movement to the second latch position/unlatched operating state. In the second latch position/unlatched operating state, the latch members 320, 340 disengage the latch keep members 202, 203 to thereby enable the closure structure 200 to advance to an open position.

The latch members 320, 340 are respectively formed having a latch body with a latch boss or latch pin 321, 341 that is received into a hole 374, 377 of a corresponding yoke member 373, 376, thereby facilitating an operational connection therewith. Each latch body also includes a bore 322, 342 through which extends a first mounting pin 303 that is fixed at the interior surface of the base frame 301. The first mounting pin 303 extends in a direction that is perpendicular to the longitudinal axis of the base frame 301 to define the first pivot axis at which the latch members 320, 340 rotate between the latched operating state and the unlatched operating state. One or more washer members 307 are operable to maintain the latch members 320, 340 at the first mounting pin 303.

The latch members 320, 340 may be composed in whole or in part of a polymer material. Embodiments, however, are not limited thereto. This disclosure contemplates forming the latch members 320, 340 of any suitable material that falls within the spirit and scope of the principles of this disclosure.

Trigger Members

The latch members 320, 340 are caused to rotate between the latched operating state and the unlatched operating state in response to rotating movement by the trigger members 310, 330. The trigger members 310, 330 are operable for rotation at a second pivot axis between a first trigger position (See FIG. 6) which assists in maintaining the latch members 320, 340 in the first latch position/latched operating state, and a second trigger position (See FIG. 8) which causes movement of the latch members 320, 340 to the second latch position/unlatched operating state. The trigger members 310, 330 are maintained in the first trigger position under spring tension of one or more bias members 308 (mounted on spring pin mounts 309) in the form of coil springs.

The trigger members 310, 330 are respectively formed having a trigger body with a trigger boss or trigger pin 311, 331 that is received into a slot 375, 378 of a corresponding yoke member 373, 376, thereby facilitating an operational connection therewith. Each trigger body also includes a bore 312, 332 through which extends a second mounting pin 304 that is fixed at the interior surface of the base frame 301. The second mounting pin 304 extends in a direction that is perpendicular to the longitudinal axis of the base frame 301 to define the second pivot axis at which the trigger members 310, 330 rotate between the first trigger position and the second trigger position. One or more washer members 307 are operable to maintain the trigger members 310, 330 at the second mounting pin 304.

When the latch members 320, 340 are in the second latch position/unlatched operating state, the trigger members 310, 330 are prevented from returning to the first trigger position. During this sequence of events, the closure structure 200 is under a constant spring force applied by the spring plunger member 204 to open the closure structure 200. As the latch members 320, 340 rotate to the second latch position/unlatched operating state, the closure structure 200 is advanced forward to at least partial open position. A user (e.g., an occupant of the passenger furniture device 100) may selectively return the moveable storage structure 200 to the closed position through an application of force. As the closure structure 200 completes its return to the closed position, the latch keep members 202, 203 engage or otherwise push against the latch members 320, 340 to cause the latch members 320, 340 to rotate in an anti-clockwise direction to the first latch position/latched operating state. The trigger members 310, 330, in turn, rotate in an anti-clockwise direction to the first trigger position, which serves to at least assist in maintaining the latch members 320, 340 in the first latch position/latched operating state.

Electro-Mechanical Actuator

An actuator is operable to cause rotation of the trigger members 310, 330 independently of each other to thereby cause a corresponding rotation of a corresponding one of the latch members 320, 340 to the second latch position/unlatched operating state.

In the illustrated exemplary embodiment, the actuator comprises an electro-mechanical actuator 350 such as, for example a solenoid 351. Embodiments, however, are not limited thereto. This disclosure contemplates the actuator comprising any suitable device that falls within the spirit and scope of the principles of this disclosure. For example, the actuator may comprise a motor, a pneumatic actuator, a hydraulic piston, or a piezoelectric actuator. Use of a single electro-mechanical actuator 350 for both trigger members 310, 330 reduces the overall size and weight of the latch lock assembly 300. Although the illustrated exemplary embodiment shows the electro-mechanical actuator 350 partially contained within the housing, embodiments are not limited thereto. This disclosure contemplates locating the electro-mechanical actuator 350 in any suitable location that falls within the spirit and scope of the principles of this disclosure. For example, the electro-mechanical actuator 350 can be contained fully within the housing, or entirely outside of the housing.

The solenoid 351, when actuated, causes an armature member 352 to advance forward. The armature member 352 is spring loaded for lateral movement under spring tension of one or more bias members 308 (mounted on spring pin mounts 309) in the form of coil springs. The armature member 352 is connected to a transverse rod 353 that is operable to slide within a clevis fastener 355. The clevis fastener 355 comprises a spaced apart flange members having a bore 356 through which extends a third mounting pin 305 that is fixed at the interior surface of the base frame 301. The third mounting pin 305 extends in a direction that is perpendicular to the longitudinal axis of the base frame frame 301 to define a third pivot axis at which the clevis fastener 355 rotates. A retaining washer 354 is fixed on the transverse rod 353 to prevent axial movement by the transverse rod 353 relative to the clevis fastener 355. As the transverse rod 353 slides it engages both trigger members 310, 330 to rotate in a clockwise direction for movement clear of the latch members 320, 340 to the second trigger position. The spring tension of the one or more bias members 308 causes the armature member 352 to return its unactuated position.

Manual Override

In event of a fault operating condition of the latch lock assembly 300 (e.g., an electrical or solenoid failure), the manual override assembly 360 may be used to advance the closure structure 200 from the stowed position to the open position. Although the illustrated exemplary embodiment shows the manual override assembly 360 contained within the housing, embodiments are not limited thereto. This disclosure contemplates locating the manual override assembly 360 in any suitable location that falls within the spirit and scope of the principles of this disclosure. For example, the manual override assembly 360 can be contained partially within the housing, or entirely outside of the housing.

The manual override assembly 360 includes a spring-loaded plunger member 361 that is under spring tension of one or more bias members 362 in the form of coil springs. The spring-loaded plunger member 361 is actuated via an actuator, such as, for example, a Bowden cable attached thereto. Once pulled/pushed, the Bowden cable moves the spring-loaded plunger member 361 rearwardly in a longitudinal direction to cause engagement with the trigger arms 313, 333, thereby causing rotation of the trigger members 310, 330 for movement clear of the latch members 320, 340 to the second trigger position.

Fault Monitoring

Figure 11:
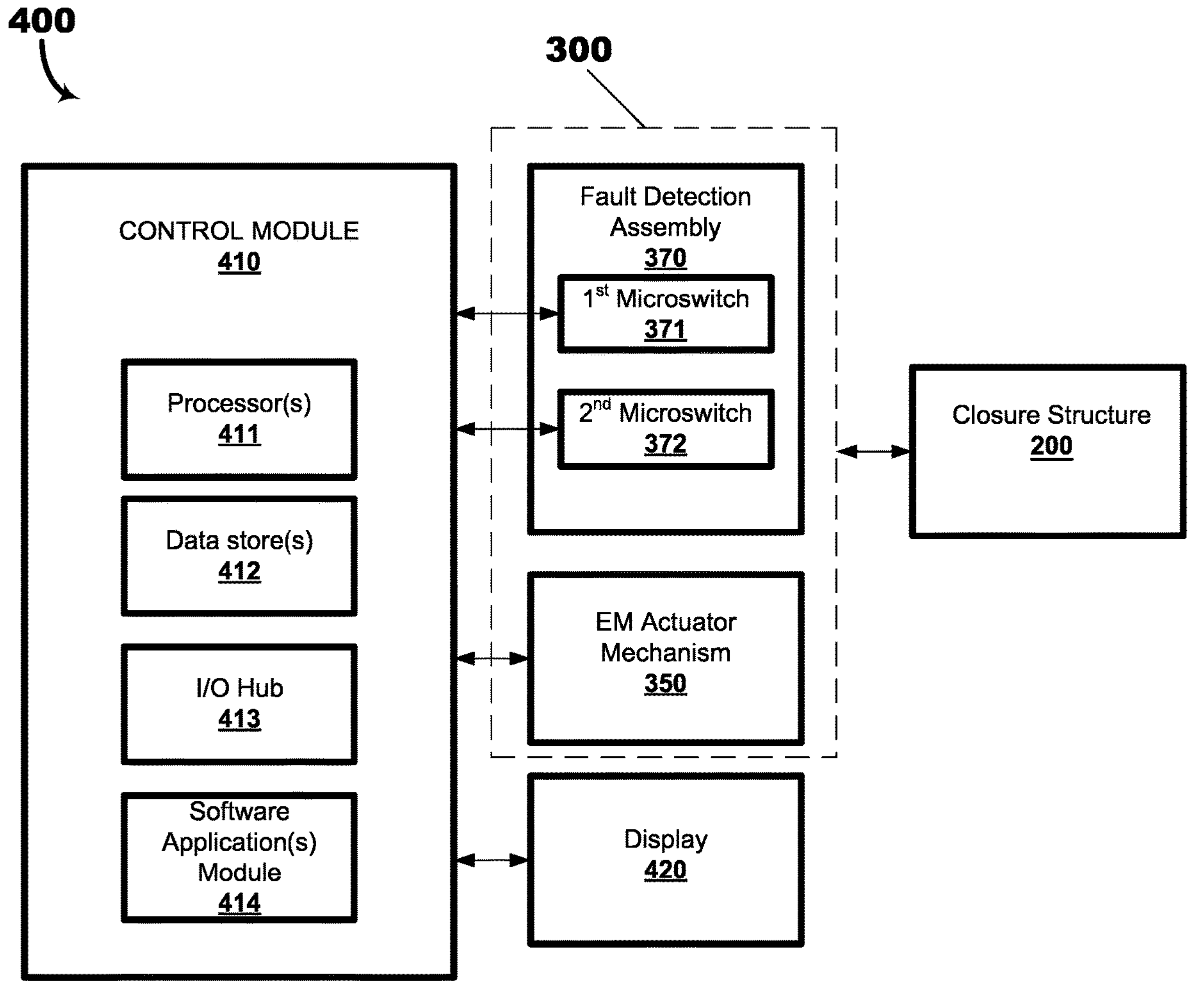
FIG. 11 illustrates an advantageous embodiment of a diagram of a vehicle cabin storage system.

In the illustrated exemplary embodiment of FIG. 11, a closure structure system 400 comprises the closure structure 200, the latch lock assembly 300, a control module 410, and a display 420.

The control module 410 comprises one or more processors 411, one or more data stores 412, and a I/O hub 413. As set forth, described, and/or illustrated herein, "processor" means any component or group of components that are operable to execute any of the processes described herein or any form of instructions to carry out such processes or cause such processes to be performed. The one or more processors 411 may be implemented with one or more general-purpose and/or one or more special-purpose processors. Examples of suitable processors include graphics processors, microprocessors, microcontrollers, DSP processors, and other circuitry that may execute software (e.g., stored on a non-transitory computer-readable medium). Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 411 may comprise at least one hardware circuit (e.g., an integrated circuit) operable to carry out instructions contained in program code. In embodiments having a plurality of processors 411, such processors 411 may work independently from each other, or one or more processors may work in combination with each other.

The one or more data stores 412 are operable to store one or more types of data. The closure structure system 400 may include one or more interfaces that enable one or more systems, sub-systems, components, etc. to manage, retrieve, modify, add, or delete, the data stored in the data stores 412. The data stores 412 may comprise volatile and/or non-volatile memory. Examples of suitable data stores 412 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data stores 412 may be a component of the one or more processors 411, or alternatively, may be operatively connected to the one or more processors 411 for use thereby. As set forth, described, and/or illustrated herein, "operatively connected" may include direct or indirect connections, including connections without direct physical contact.

The I/O hub 413 is operatively connected to other systems, sub-systems, components, etc. of the closure structure system 400. The I/O hub 413 may comprise an input interface and an output interface. The input interface and the output interface may be integrated as a single, unitary interface, or alternatively, be separate as independent interfaces that are operatively connected. The input interface is defined herein as any device, component, system, subsystem, element, or arrangement or groups thereof that enable information/data to be entered in a machine. The input interface may comprise a user interface (UI), graphical user interface (GUI) such as, for example, a display, human-machine interface (HMI), or the like. Embodiments, however, are not limited thereto, and thus, this disclosure contemplates the input interface comprising any suitable configuration that falls within the spirit and scope of the principles of this disclosure. For example, the input interface may comprise a keypad, toggle switch, touch screen, multi-touch screen, button, joystick, mouse, trackball, microphone and/or combinations thereof.

The output interface is defined herein as any device, component, system, subsystem, element, or arrangement or groups thereof that enable information/data to be visually and/or audially presented to the user. The output interface may be operable to present information/data to the user. The output interface may comprise one or more of a visual display 420 or an audio display such as a microphone, earphone, and/or speaker.

In operation, the input interface may be used by a user, such as, for example, an occupant of a seat unit associated with the closure structure system 400. The user engage the input interface which, in turn, causes actuation of the electro-mechanical actuator 350.

The fault detection assembly 370 includes the yoke members 373, 376 that correspond to a pair of microswitches 371, 372 that are collectively operable, at least during operation of the closure structure system 400, to dynamically detect, capture, determine, assess, monitor, measure, quantify, and/or sense one or more fault operation conditions of the closure structure system 400. For example, the fault detection assembly 370 is operable to dynamically detect, capture, determine, assess, monitor, measure, quantify, and/or sense (in real-time), one or more fault operating states of the closure structure 200 and/or the latch lock assembly 300. As set forth, described, and/or illustrated herein, "real-time" means a level of processing responsiveness that a user, system, subsystem, or component senses as sufficiently immediate for a particular process or determination to be made, or that enables the processor to keep up with some external process.

Operation of the control module 410 may be implemented as computer readable program code that, when executed by the one or more processors 411, implement one or more of the various processes set forth, described, and/or illustrated herein. The control module 410 may be a component of the one or more processors 411, or alternatively, may be executed on and/or distributed among other processing systems to which the one or more processors 411 are operatively connected. The control module 410 may include a set of logic instructions executable by the one or more processors 411. Alternatively, or additionally, the one or more data stores 412 may contain such logic instructions. The logic instructions may include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Due to the electrical connection between the control module 410 and the microswitches 371, 372, detection (e.g., as sensor data) of one or more fault operation conditions of the closure structure 200 and/or the latch lock assembly 300 is to occur. The captured sensor data may be located in a database of the one or more data stores 412 or an external source (e.g., cloud-based data store(s)).

The yoke members 373, 376, during rotation about the pins 321, 341 at a first end thereof, follows the rotational arc of the corresponding latch members 320, 340 during rotation of the latch members 320, 340 to the second latch position/unlatched operating state. The opposite end of the yoke members 373, 376 is connected to the corresponding trigger members 310, 330 via the slot 375, 378 to convert the radial motion of the trigger members 310, 330 into linear motion. As both the trigger members 310, 330 and latch members 320, 340 move, the movement of the yoke members 373, 376 engages by direct physical, contact the microswitches 371, 372 that denotes or otherwise indicates a change of state within the microswitches 371, 372. By virtue of the connection of the yoke members 373, 376, a failure by either the trigger members 310, 330 or the latch members 320, 340 to rotate separately, will result in actuation of the microswitches 371, 372. The microswitches 371, 372 are monitored by fault monitoring software residing in the software application(s) module 414 of the control module 410. Should any unexpected change of operating state occur in the closure structure 200 and/or the latch lock assembly 300, the control module 410 may transmit one or more control signals that cause one or more fault warnings signals (e.g., visual, audio, haptic, etc.). For example, the control module 410 is operable to cause a visual display of a detected fault operating condition on a display 420.

Alternatively or additionally, the microswitches 371, 372 are electrically connected in series to transmit a binary open or closed electric signal to the fault monitoring software. An unexpected open/closed fault operating condition could then be visually displayed on the display 420.

Operation

To open the closure structure 200, the seat occupant engages (e.g., by pressing) an actuation button, which actuates the solenoid 351. The solenoid 351 then causes the armature member 352 to advance forward. The armature member 352 operatively is connected to the transverse rod 353 that slides within the clevis fastener 355. As the transverse rod 353 slides it engages (e.g., by pushing) both trigger members 310, 330 to cause rotation to the second trigger position. As illustrated in the exemplary embodiment of FIG. 10, rotation by the trigger members 310, 330 causes a corresponding rotation of the latch members 320, 340 in a clockwise direction to disengage the connection with the latch keep members 202, 203. Such disengagement thereby facilitates or otherwise initiates the closure structure 200 advancing to the open position. The remaining spring tension maintains the latch members 320, 340 in the second latch position/unlatched operating state and ready to accept the latch keep members 202, 203 when the closure structure 200 returns to the fully seated and closed position.

Fault Operating Conditions

In the illustrated exemplary embodiment of FIG. 11, the control module 410, via the fault monitoring software residing in the software application(s) module 414, is operable to monitor the latch lock assembly 300 in a manner to detect one or more fault operating conditions. In response to a detected fault operating condition, the control module 410 will transmit a control signal causing at least a visual display of a detected fault operating condition on a display 420. Fault operating conditions include but is not limited to the following examples.

Fault Operating Condition 1

In this fault operating condition, the latch lock assembly 300 functions correctly, however, the closure structure 200 fails to advance to the open position. The microswitches 371, 372 will both change operating for the time it takes for the solenoid 351 to actuate. The trigger members 310, 330 will rotate to the second trigger position, thus changing the operating state of the microswitches 371, 372 (See FIG. 10). The latch members 320, 340, unable to rotate, will allow the trigger members 310, 330 to return to the first trigger position, which causes the microswitches 371, 372 to return to their original operating state. This momentary change of operating state of the microswitches 371, 372 will function with either series connected microswitches 371, 372 or individual switch connection to the control module 410.

Fault Operating Condition 2

There are at least two possible causes in an event either/both latch members 320, 340 fails to rotate from the first latch position/latched operating state to the second latch position/unlatched operating state.

The first cause of this type of latch failure is due to a failure of the solenoid 351, in which the manual override assembly 360 may be employed to open the closure structure 200. In such an event, both of the microswitches 371, 372 remain in the closed state. Such functionality is possible with either series connected microswitches 371, 372 or individual switch connection to the control module 410.

The second cause of this type of latch failure is due to a failure of one/both trigger members 310, 330, in which the manual override assembly 360 may be employed to open the closure structure 200. In such an event, the microswitches 371, 372 will show differing operating states. Such functionality is possible with either series connected microswitches 371, 372 or individual switch connection to the control module 410.

Fault Operating Condition 3

There are at least two possible causes in an event either/both latch members 320, 340 fails to return from the second latch position/unlatched operating state to the first latch position/latched operating state.

The first cause of this type of latch failure is when the upper latch arm of either/both latch members 320, 340 is broken, thus causing the latch members 320, 340 to rotate to the first latch position/latched operating state, but will not engage corresponding one of the lock keep members 202, 203. This will allow the corresponding one of the yoke members 373, 376 to move freely along the axis of the slot 375, 378 preventing a change of operating state of the corresponding one of the microswitches 371, 372.

The second cause of this type of latch failure is due the lower latch arm of either/both latch members 320, 340 is broken, thus causing the corresponding one of the microswitches 371, 372 to remain in the unlocked switch position.

Fault Operating Condition 4

There are at least two possible causes in an event one/both of the trigger members fail to rotate to the second trigger position.

The first cause of this type of trigger failure is due to a failure of the solenoid 351, in which the manual override assembly 360 may be employed to open the closure structure 200. In such an event, both of the microswitches 371, 372 remain in the closed state. Such functionality is possible with either series connected microswitches 371, 372 or individual switch connection to the control module 410.

The second cause of this type of trigger failure is due to a mechanical failure of one/both of the trigger members 310, 330.

Fault Operating Condition 5

In this type of fault operating condition, one/both of the trigger members fail to return to the first trigger position. In such an event, one of the latch members 320, 340 will maintain the closure structure 200 in the stowed position. One of the yoke members 373, 376 will keep the switch state closed, thus giving differing switch operating states.

Fault Operating Condition 6

In this type of fault operating condition, the closure structure 200 will not advance to an open operating state. The manual override assembly 360 may be employed to open the closure structure 200.

Fault Operating Condition 7

In this type of fault operating condition, the solenoid 351 fails to actuate, in which the manual override assembly 360 may be employed to open the closure structure 200. The switch state will not change until the manual override assembly 360 is actuated. The control module 410 would detect a change of switch state after transmitting a control signal to actuate the solenoid 351.

Fault Operating Condition 8

Figure 9:
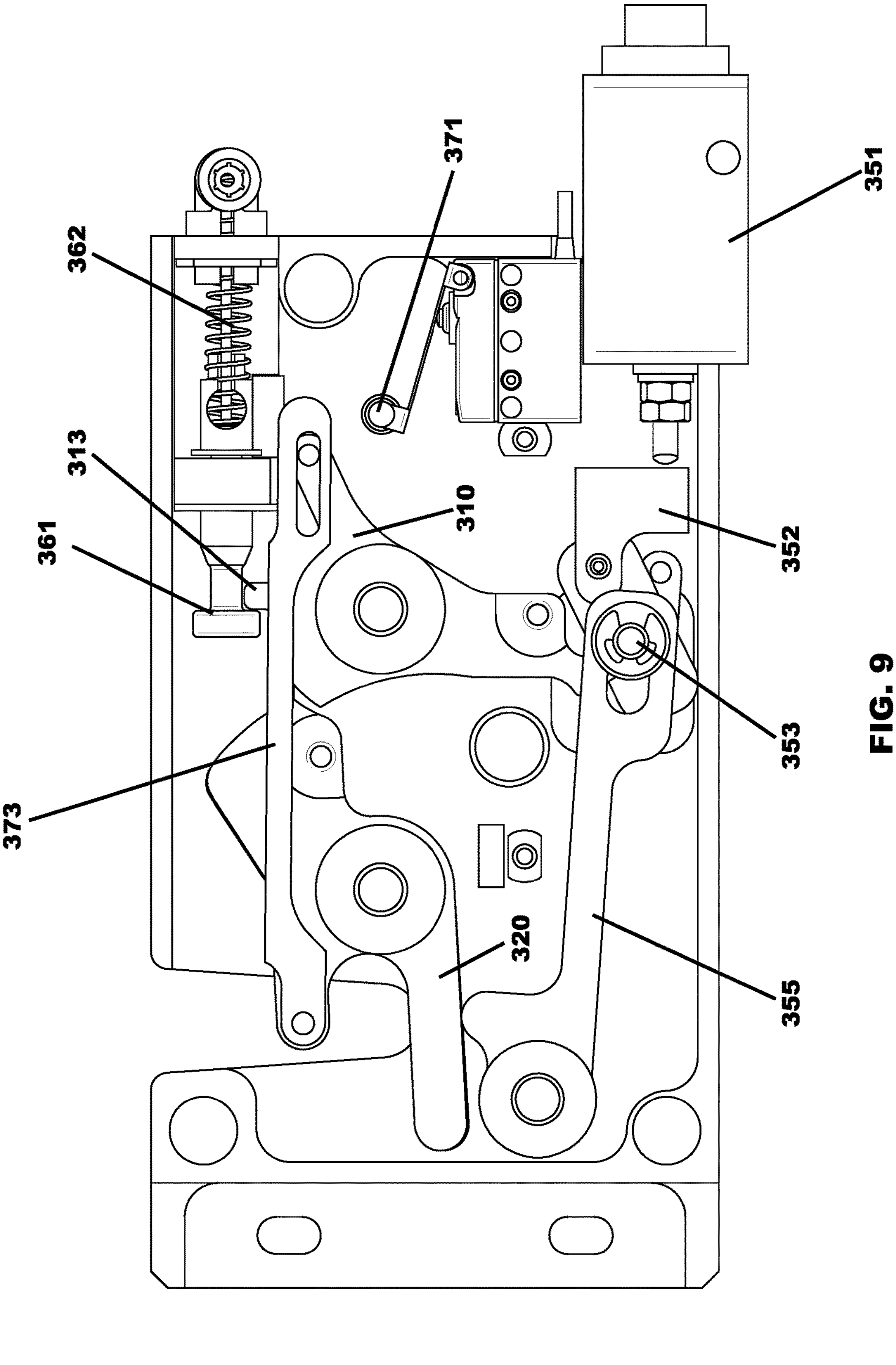
FIGS. 9 and 10 illustrates top views of the latch lock assembly of FIG. 2 in a fault operating state.

In this type of fault operating condition, the solenoid 351 remains in the open position. In such an event, as the closure structure 200 is moved to the stowed position, the trigger members 310, 330 remain in the second trigger position held by the armature member 352. This prevents the latch members 320, 340 staying in the first latch position/latched operating state. By pushing the closure structure 200 back further than its normal, fully seated position, the clevis fastener 355 is pushed downwardly by the over rotation of the latch members 320, 340 (See FIG. 9). This moves the transverse rod 353 clear of the trigger members 310, 330, thereby allowing them to rotate into the first trigger position. The manual override assembly 360 may be employed to open the closure structure 200.

Should the solenoid 351 become free, it will go back to its unactuated operating position, with movement of the transverse rod 353 rotating the clevis fastener 355 against the bias member 309. When the closure structure 200 is pushed past its normal, fully seated position, the latch members 320, 340 rotate against the clevis fastener 355, forcing it to rotate against the bias member 309. This in turn moves the transverse rod 353 downward, allowing the trigger members 310, 330 to rotate back to the first trigger position.

Computer-Implemented Method

Figure 12:
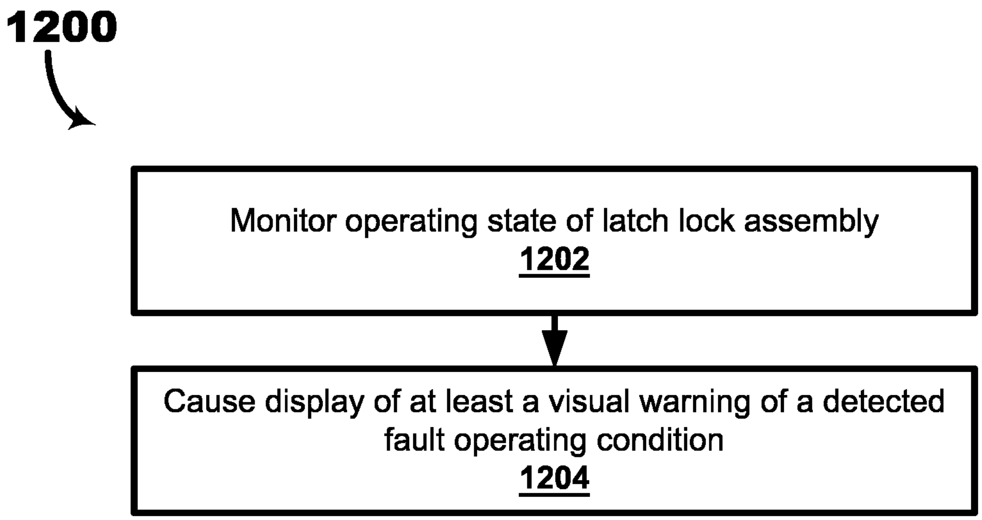
FIG. 12 illustrates an advantageous embodiment of a computer-implemented method of operating a latch lock assembly.

In the illustrated exemplary embodiment of FIG. 12, a computer-implemented method 1200 is provided. The flowchart of the computer-implemented method 1200 is implemented by the one or more processors 411 of the control module 410. In particular, the computer-implemented method 1200 is implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

Software executed by the control module 410 provides functionality described or illustrated herein. In particular, software executed by the one or more processors 411 is operable to perform one or more processing blocks of the computer-implemented method 1200 set forth, described, and/or illustrated herein, or provides functionality set forth, described, and/or illustrated.

Illustrated process block 1202 includes monitoring an operating state of the latch lock assembly.

The computer-implemented method 1200 may then proceed to illustrated process block 1204, which includes causing, in response to receipt of an electric signal that is indicative of a detected fault operating condition of the vehicle cabin storage assembly, display of at least a visual warning of a detected fault operating condition.

The computer-implemented method 1200 can terminate or end after execution of process block 1204.

The terms "coupled," "attached," or "connected" used herein is to refer to any type of relationship, direct or indirect, between the components in question, and is to apply to electrical, mechanical, fluid, optical, electro-magnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action is to occur, either in a direct or indirect manner.

Those skilled in the art will appreciate from the foregoing description that the broad techniques of the one or more embodiments of the present disclosure is to be implemented in a variety of forms. Therefore, while the present disclosure describes matters in connection with particular embodiments thereof, the true scope of the embodiments of the present disclosure should not be so limited since other modifications will become apparent to the skilled practitioner upon a study of the drawings, specification, and following claims.

What is claimed is:

1. A latch lock assembly, comprising:

a housing;

a first latch member pivotably mounted to the housing and a second latch member pivotably mounted to the housing, each latch member for rotation between a latched operating state to maintain a base frame of a closure structure system in a stowed position and an unlatched operating state to initiate advancement of the base frame from the stowed position to an open position;

a first trigger member pivotably mounted to the housing and operable to cause rotation of the first latch member;

a second trigger member pivotably mounted to the housing and operable to cause rotation of the second latch member;

an actuator mechanism operable to cause rotation of the first trigger member and the second trigger member to cause rotation of both the first latch member and the second latch member to the unlatched operating state;

a fault detection assembly operable to detect a fault operating condition of at least one of the latch lock assembly and the base frame; and a manual override mechanism to advance the base frame from the stowed position to the open position in response to the detected fault operating condition, the manual override mechanism operatively connected to the first trigger member and the second trigger member to actuate both the first trigger member and the second trigger member in response to the detected fault operating condition.

2. The latch lock assembly of claim 1, wherein:

the first trigger member causes the rotation of the first latch member to the unlatched operating state; and the second trigger member causes the rotation of the second latch member to the unlatched operating state.

3. The latch lock assembly of claim 2, wherein the fault detection assembly comprises:

a first yoke member operatively connected to the first latch member and the first trigger member for rotation in response to the rotation of the first latch member and the first trigger member, and a second yoke member operatively connected to the second latch member and the second trigger member for rotation in response to the rotation of the second latch member and the second trigger member.

4. The latch lock assembly of claim 3, wherein the fault detection assembly comprises:

a first electric microswitch operable to detect of change of operating state of the latch lock assembly in response to engagement by the first yoke member, and a second electric microswitch operable to detect of change of operating state of the latch lock assembly in response to engagement by the second yoke member.

5. The latch lock assembly of claim 4, further comprising a control module having one or more processors and a non-transitory memory coupled to the one or more processors, the non-transitory memory including a set of instructions of computer-executable program code, which when executed by the one or more processors, cause the control module to:

monitor the first electric microswitch and the second electric microswitch, and cause, in response to receipt of an electric signal from at least one of the first electric microswitch and the first electric microswitch that is indicative of the detected fault operating condition, display of at least a visual warning of the detected fault operating condition.

6. The latch lock assembly of claim 1, wherein the base frame comprises a drawer.

7. The latch lock assembly of claim 1, wherein the base frame comprises a bin.

8. The latch lock assembly of claim 1, wherein the base frame comprises a door.

9. The latch lock assembly of claim 1, wherein the first latch member and the second latch member are operable for rotation about a first pivot axis and the first trigger member and the second trigger member are operable for rotation about a second pivot axis.

10. The latch lock assembly of claim 1, wherein when the closure structure system is in the stowed position, latch keep members extending from the base frame engage the first latch member and the second latch member.

11. The latch lock assembly of claim 10, wherein when the closure structure system is in the open position, the latch keep members are disengaged from the first latch member and the second latch member.

12. A closure structure system, comprising:

a base frame moveable between a stowed position and an open position; and a latch lock assembly including:

a housing;

a first latch member pivotably mounted to the housing and a second latch member pivotably mounted to the housing, each latch member for rotation between a latched operating state to maintain the base frame in a stowed position and an unlatched operating state to initiate the base frame advancing from the stowed position to an open position;

a first trigger member pivotably mounted to the housing and operable to cause rotation of the first latch member;

a second trigger member pivotably mounted to the housing and operable to cause rotation of the second latch member;

an actuator mechanism operable to cause rotation of the first trigger member and the second trigger member to cause rotation of both the first latch member and the second latch member to the unlatched operating state;

a fault detection assembly operable to detect a fault operating condition of at least one of the latch lock assembly and the base frame; and a manual override mechanism to advance the base frame from the stowed position to the open position in response to the detected fault operating condition, the manual override mechanism operatively connected to the first trigger member and the second trigger member to actuate both the first trigger member and the second trigger member in response to the detected fault operating condition.

13. The closure structure system of claim 12, wherein:

the first trigger member causes the rotation of the first latch member to the unlatched operating state; and the second trigger member causes the rotation of the second latch member to the unlatched operating state.

14. The closure structure system of claim 13, wherein the fault detection assembly comprises:

a first yoke member operatively connected to the first latch member and the first trigger member for rotation in response to the rotation of the first latch member and the first trigger member, and a second yoke member operatively connected to the second latch member and the second trigger member for rotation in response to the rotation of the second latch member and the second trigger member.

15. The closure structure system of claim 14, wherein the fault detection assembly comprises:

a first electric microswitch operable to detect of change of operating state of the latch lock assembly in response to being engaged by the first yoke member, and a second electric microswitch operable to detect of change of operating state of the latch lock assembly in response to being engaged by the second yoke member.

16. The closure structure system of claim 15, further comprising a control module having one or more processors and a non-transitory memory coupled to the one or more processors, the non-transitory memory including a set of instructions of computer-executable program code, which when executed by the one or more processors, cause the control module to:

monitor the first electric microswitch and the second electric microswitch, and cause, in response to receipt of an electric signal from at least one of the first electric microswitch and the first electric microswitch that is indicative of a detected fault operating condition, display of at least a visual warning of the detected fault operating condition.

17. The closure structure system of claim 12, wherein the base frame comprises a drawer.

18. The closure structure system of claim 12, wherein the base frame comprises a bin.

19. The closure structure system of claim 12, wherein the base frame comprises a door.

20. A latch lock assembly, comprising:

a housing;

a first latch member pivotably mounted to the housing for rotation about a first pivot axis;

a second latch member pivotably mounted to the housing for rotation about the first pivot axis, wherein each latch member rotates between a latched operating state to maintain a base frame of a closure structure system in a stowed position and an unlatched operating state to initiate advancement of the base frame from the stowed position to an open position;

a first trigger member pivotably mounted to the housing for rotation about a second pivot axis and operable to cause rotation of the first latch member to the unlatched operating state;

a second trigger member pivotably mounted to the housing for rotation about the second pivot axis and operable to cause rotation of the second latch member to the unlatched operating state;

an actuator mechanism operable to cause rotation of the first trigger member and the second trigger member about the first pivot axis; and a manual override mechanism operatively connected to the first trigger member and the second trigger member such that in the event of a fault operating condition of the closure structure system, the manual override mechanism causes rotation of both the first trigger member and the second trigger member which causes rotation of the first latch member and the second latch member to the unlatched operating state in order to initiate advancement of the base frame from the stowed position to the open position.

* * * * *